Sept. 29, 1953 W. H. MANNING ET AL 2,653,728
DRIVE SEAL RETAINER
Filed July 28, 1948

Inventors
William H. Manning &
Kenneth L. Hulsing
By
Spencer, Willits, Helwig & Baillio
Attorneys

Patented Sept. 29, 1953

2,653,728

UNITED STATES PATENT OFFICE 2,653,728

DRIVE SEAL RETAINER

William H. Manning, Birmingham, and Kenneth L. Hulsing, Plymouth, Mich., assignors to General Motors Corporation, Detroit, Mich., a corporation of Delaware Application July 28, 1948, Serial No. 41,128

1 Claim. (Cl. 220—24.5)

This invention relates to closure devices for openings and passages.

The principal object of the invention is to provide a removable, inexpensive, lightweight, resilient closure device of flat form and means engageable therewith for deflecting the device for insertion into an opening or passage of smaller dimension than the device so that upon disengagement of this means it acts as a toggle spring and is continuously urged into tight engagement with the wall of the opening or passage with sufficient force to prevent fluid leakage past the closure device and to also serve as a mechanism retaining device.

The closure device and means for application and removal thereof has other novel features and the object of the invention and these features will become apparent by reference to the following description and drawings of closure devices of disk form and the means for applying these devices in and removing them from the opening in a piston for the piston pin, for retaining the pin, and for preventing oil and gas leakage past the closure. It will be obvious from the following description that flexible closure devices of other than disk form may be used in openings of other than circular form for this purpose; these closure devices may, for example, be of elliptical, polygonal, star or other shapes for insertion into openings of any desired form.

Figures 2 and 8 of the drawings are perspective views of different forms of the closure device.

Figure 5:
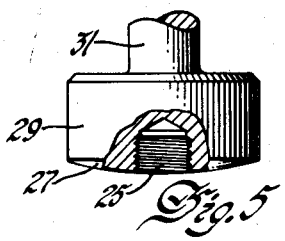
Figure 6:
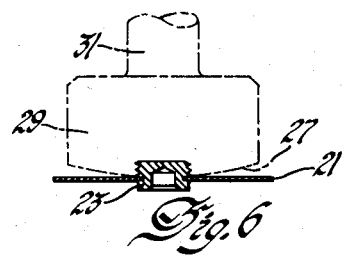
Figure 6 is a vertical sectional view of the closure device shown in Figure 8.
Figure 7:
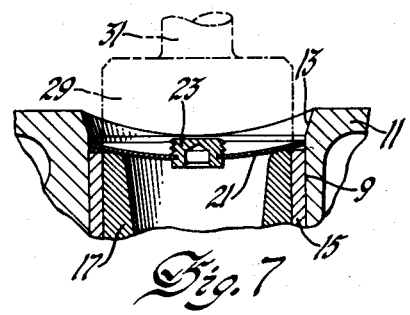
Figure 8:
Figure 9:
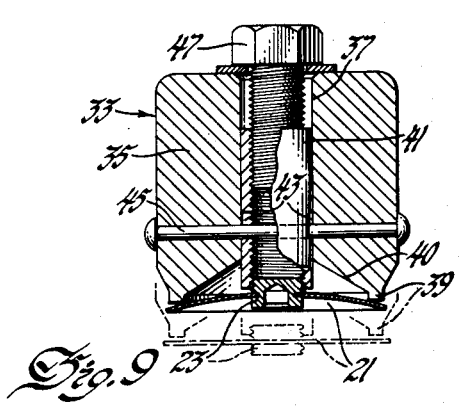
Figure 10:
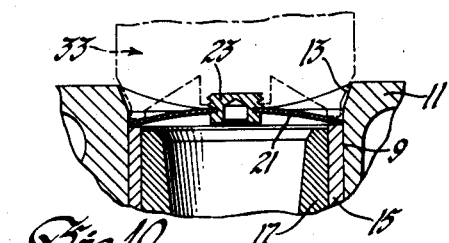

Figures 7 and 10 are vertical sectional views with parts of the piston and the closure device of Figures 6 and 8 installed by means of the applying means of Figures 9 and 5, these means being shown in dotted lines.

Figure 1:
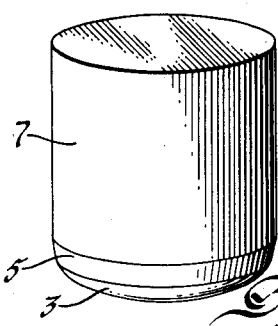
Figures 1, 5 and 9 illustrate different forms of the means for applying and removing of the closure means, Figure 1 being a perspective view and Figures 5 and 9 being side elevation views with parts broken away and in section.
Figure 2:
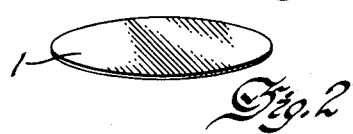
Figure 3:
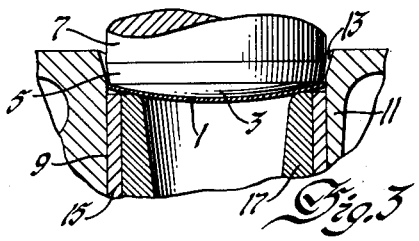
Figures 3 and 4 are vertical sectional views with parts broken away and in section of the closure device of Figure 2 and the means of Figure 1, whereby the device is installed in the opening of the piston including a piston pin and bushing.
Figure 4:
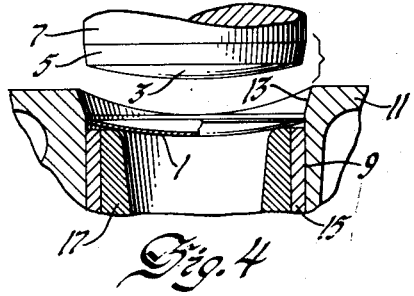

The closure means 1, shown in Figure 2, is a thin, flat, resilient spring disk of slightly greater diameter than the cylindrical opening to be closed thereby. As best illustrated in Figures 3 and 4, the closure disk 1 is engaged by the spherical end portion 3 having a chamfered portion 5 adjacent thereto of nonmetallic drift 7 of less diameter than the cylindrical opening 9 in a piston 11 having a chamfered outer end portion 13 containing a bushing 15 in which a hollow wrist pin 17 is movably mounted. Force applied axially on the disk 1 with its edge in contact with the chamfered portion 11 of the opening 9 by contact of the spherical end 3 of the drift deflects it into a dished form so that it passes into the opening 9 adjacent the bushing 15 and pin 17. Removal of the drift 7 allows the dished disk 1, as shown in Figure 4, to act as a toggle spring so that the edge of the disk is continuously and uniformly urged into sealing contact with the wall of the opening 9 and also serves to prevent axially outward movement of the piston pin 17. Removal of the dished disk 1 is readily accomplished by striking it with a prick punch which shatters and penetrates the disk of spring material after which it may be easily pried outwardly of the opening 9.

The closure device illustrated in Figures 6 and 8 is likewise a thin, flat resilient spring disk 21 of slightly larger diameter than the opening 9 of the piston 11 and is provided with a central opening in which a threaded connector 23 is secured in fluidtight relation with opposite sides of the disk by upsetting and riveting of the connector. As best shown in Figure 6 threaded connector 23 is engaged by the central internally threaded portion 25 in the spherical end 27 of the cylindrical portion 29 of the tool, shown in Figure 5, having a handle portion 31. It will be evident that the disk 21 will likewise assume a dished form, as shown in Figure 7, when in threaded engagement with the spherical end 27 of the tool and axial force is applied to the tool handle 31 to push the edge of the disk inwardly of the outer chamfered portion 11 of and into the opening 9 in the piston 13. Unscrewing of the tool likewise causes the dished disk 21 to act as a toggle spring in the same manner and for the same purpose as that previously described with reference to spring disk shown in Figures 3, 4 and 5. The disk 21 may be readily removed by reengagement of the threaded connector 23 of the dished disk with the threaded portion 25 of the tool shown in Figure 5, by applying a prying force to the handle 31 of the tool.

The disk 21 by means of its threaded connector 23 may be dished prior to insertion into the opening 9 in the piston 13, unscrewed therefrom, and reengaged for removal from this opening for reuse for the same purposes as previously described by means of the tool shown generally at 33 in Figure 9. This tool comprises a cylindrical block 35 having an axial bore 37 and an annular flange 39 at one end concentric to the bore 37 and of lesser outside diameter than the opening 9 in the piston and the disk 21. The end surface 40 within the annular flange tapers inwardly to the bore 37. An internally threaded bushing 41 is slidably mounted in the bore 37 of the block 35 and is provided with diametrically disposed axially extending slots 43. A rivet 45 extends through a diametral hole in the block 35 and through the diametral slots 43 of the bushing 41 to prevent rotation thereof in the bore 37 and to limit axial movement thereof relative to the bore in the block 35. A cap screw 47 is threaded into the outer end of the bushing 41 opposite that of the annular end flange 39 of the block and the inner threaded end of the bushing 41 may be engaged with the threaded connector 23 of the disk 21 so that upon tightening of the cap screw 47 the bushing and connector is moved inwardly of the annular flange of the block to engage the outer portion of the disk 21 with this flange and cause the disk to be dished inwardly, as best shown in Figure 9, so that it may be inserted into the opening 9 of the piston 11, as shown in Figure 10. Loosening of the cap screw 47 causes the dished disk to likewise act as a dished disk toggle spring for uniform and continuous engagement with the wall of the piston opening 9 to serve as a fluid seal and piston pin retainer when the bushing 41 of the tool is unscrewed from the disk connector 23. The bushing of the tool can be screwed back on the disk connector 23 and the cap screw tightened to dish the disk sufficiently for removing it for subsequent use without damage thereto. It will be evident that either of the disks 1 and 21 may be used for closing cylindrical passages in other mechanisms without the necessity of a chamfer at the outer end of these passages as illustrated and by use of the disk 21 provided with the connector 23 and either of the tools shown in Figures 5 and 9 with an outside diameter less than the diameter of the opening the disk may be caused to engage the wall of the opening or passage in uniform and continuous sealing relation at any distance desired from the entrance of the opening or passage by providing suitable extension tools.

From actual tests it has been found by varying the diametral interference between the flat spring disk and the opening in which it is to be inserted by dishing, or by varying the thickness of the disk, various desired values of axial force on the dished disk may be obtained for reversing its dished form and for pressing it out of fluid sealing and retaining engagement from the wall of the opening by either fluid pressure or other suitable tool.

Resilient flat closures of other than disk form may obviously be deflected into bowed or dished form for insertion in and removal from openings of any form and of smaller dimensions than these closures in a similar manner and for the same purposes as those of disk form.

We claim:

The combination of a member having a smooth cylindrical passage and a closure therein, said closure consisting of a disk normally flat and normally of greater diameter than the passage and of elastic material having sufficient flexibility to enable its being dished by application of opposing forces to its central and peripheral portions for insertion into operative position in the passage, and having sufficient stiffness to effect it s retention therein by frictional engagement of its peripheral edges with the walls of the passage upon relieving said forces, and a connector extending in fluid-tight relation through the center of the disk, said connector having integral inwardly and outwardly projecting end portions having parallel shoulders abutting opposite sides of the disk, said outwardly projecting portion being externally threaded.

WILLIAM H. MANNING.
KENNETH L. HULSING.

References Cited in the file of this patent

UNITED STATES PATENTS

| Number | Name | Date |
|---|---|---|
| 397,835 | Cuthbert | Feb. 12, 1889 |
| 528,544 | Kempster | Nov. 6, 1894 |
| 1,432,475 | Lord | Oct. 17, 1922 |
| 1,746,016 | Shiffman et al. | Feb. 4, 1930 |
| 1,799,876 | Travis | Apr. 7, 1931 |
| 1,833,030 | McClatchie | Nov. 24, 1931 |
| 1,978,025 | McCown | Oct. 23, 1934 |
| 2,167,619 | Bainton | Aug. 1, 1939 |
| 2,202,754 | Caddy | May 28, 1940 |
| 2,330,742 | Poupitch | Sept. 28, 1943 |
| 2,579,845 | McWherter | Dec. 25, 1951 |

FOREIGN PATENTS

| Number | Country | Date |
|---|---|---|
| 481,839 | France | Oct. 27, 1916 |